United States Patent [19]
Abdala et al.

[11] Patent Number: 5,338,396
[45] Date of Patent: Aug. 16, 1994

[54] METHOD OF FABRICATING IN-MOLD GRAPHICS

[75] Inventors: Julio A. Abdala, Miami; Jill C. Olkoski, Fort Lauderdale, both of Fla.

[73] Assignee: Motorola, Inc., Schaumburg, Ill.

[21] Appl. No.: 143,727

[22] Filed: Nov. 1, 1993

[51] Int. Cl.$^5$ .............................................. B44C 1/22
[52] U.S. Cl. ..................... 156/655; 156/630; 156/633; 156/643; 156/645; 156/658; 156/668; 156/905
[58] Field of Search ............... 156/630, 633, 643, 645, 156/655, 658, 659.1, 668, 905

[56] References Cited

U.S. PATENT DOCUMENTS

| | | | |
|---|---|---|---|
| 3,052,581 | 9/1962 | Gutknecht | 156/660 |
| 4,552,829 | 11/1985 | Masaki | 156/658 X |
| 5,259,926 | 11/1993 | Kuwabara et al. | 156/659.1 |

OTHER PUBLICATIONS

"New Design Consideration: Recyclability" from Plastics Design Forum, May/Jun. 1990.

Primary Examiner—William Powell
Attorney, Agent, or Firm—Dale W. Dorinski

[57] ABSTRACT

A method for fabricating an in-mold graphics surface (16). A layer of an etchable material (12) is molded on a contrasting surface (13). The layer is then etched to expose the contrasting surface and produce the in-mold graphics surface. In another embodiment, a layer of hardcoat material (11) is molded over the etchable layer. The etching is accomplished by using a laser beam to selectively etch the etchable layer, while not etching the contrasting surface. The hardcoat layer (11), the etchable layer (12), and the contrasting surface (13) can be molded to a larger part (14) during an injection molding process. The graphic desing is later etched in the part to produce a customized design.

19 Claims, 1 Drawing Sheet

METHOD OF FABRICATING IN-MOLD GRAPHICS

TECHNICAL FIELD

This invention relates in general to methods of graphics fabrication, and more specifically to a method of creating graphic images in molded materials.

BACKGROUND

Plastic parts have traditionally been marked or decorated by hot stamping, silk screening, or painting. In each of these operations, the marking or decoration is placed on the exterior of the plastic part in a secondary operation. One major disadvantage of these techniques is that the marking or design, being on the exterior surface of the part, is subject to degradation by erosion or wear. For example, plastic keypad buttons on typewriters and computer keyboards are subject to constant wear by human fingers actuating the keys. Over a period of time, the printed ink on the keys becomes worn away, making the keyboard unsuitable for use by an unskilled typist. Chemists have toiled countless hours in attempts to create a more permanent inking composition, with varying degrees of success.

One way of overcoming this problem is to actually mold the desired indicia into the plastic. A technique known as 'double shot molding' forms the first part of the object in one color of plastic. The remainder of the part is then molded in a second step or shot in a contrasting color, such that the two contrasting color plastics are exposed on the surface of the part, creating the desired indicia. This solves the problem of wear and erosion, but is costly because each part must have a specifically designed mold, and the two shot molding process consumes more molding time, thus increasing the finished cost of the part. If unique or custom designs are required, this process is not a feasible solution.

Other solutions are to cover the printed graphics by laminating a clear layer of plastic over the indicia. This also requires a secondary operation, and may not be suitable for all applications. It can require that the part be reheated, causing it to warp or distort. Another alternate technique is known as in-mold heat transfer decorating. In this process, two operations are performed simultaneously, thus eliminating the labor, time, and space required for secondary functions. Plastic parts are injection molded and decorated in one shot on the molding machine. The process uses a film or foil of gravure printed graphics. The graphics are preprinted and imbedded behind a layer of clear plastic. The film is registered in the proper position in the mold, the mold closes, and the plastic part is formed by conventional injection molding. During the molding process, the film becomes integral to the finished part, thereby creating the decoration on the part. Although this process solves many of the prior art problems, it still has the disadvantage of not allowing for flexibility in custom decorations or markings. Each design requires a unique label or foil, and many parts must be stocked.

Clearly a need exists in the industry for a process that can be used to fabricate a plastic part having indicia, that provides for rapid and easy customization of the finished marking.

SUMMARY OF THE INVENTION

Briefly, according to the invention, there is provided a method for fabricating an in-mold graphics surface. A layer of an etchable material is molded on a contrasting surface. The layer is then etched to expose the contrasting surface and produce the in-mold graphics surface. In another embodiment, a layer of hardcoat material is molded over the etchable layer. The etching is accomplished by using a laser beam to selectively etch the etchable layer, but not etch the contrasting surface.

BRIEF DESCRIPTION OF THE DRAWINGS

The FIG. 1 is a partial cut-away perspective view of an etched surface in accordance with the invention.

DETAILED DESCRIPTION OF THE PREFERRED EMBODIMENT

Figure 1:
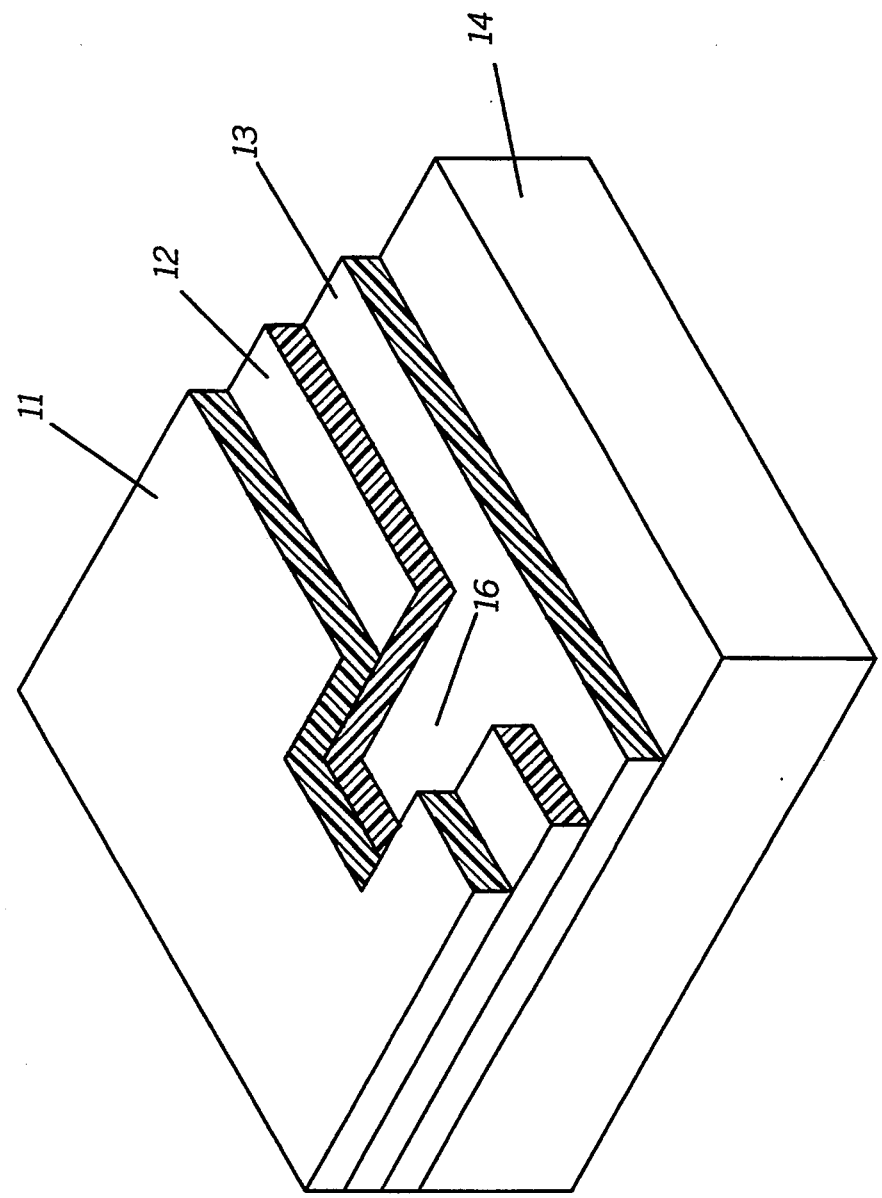

While the specification concludes with claims defining the features of the invention that are regarded as novel, it is believed that the invention will be better understood from a consideration of the following description in conjunction with the drawing figures.

The FIGURE illustrates an in-molded graphic 10 that includes a hardcoat layer 11 molded to an etchable material 12, a contrasting surface 13, and a plastic 14. The in-molded graphic 10 further includes an in-molded graphic symbol 16 that is etched in a pattern. The invention begins with the molding of at least one layer of an etchable material 12 on a contrasting surface 13. The etchable material 12 can be an ink which is bonded to the contrasting surface 13 during an injection molding process of the part. Then, the etchable material is etched away in a predetermined pattern in order to expose the contrasting surface underneath. There may also be a layer of hardcoat material 11 over the etchable material which serves to protect it from abrasion. This hardcoat 11 will also be etched away at the same time that the etchable material 12 is being etched. With respect to etching by using a laser, it is possible to remove the etchable material 12, because it absorbs the light and burns off. Since different colors absorb and reflect different amounts of light, the light will be able to selectively etch different layers, depending on what color they are. For example, if the construction was such that the first layer 11 was hardcoat, the second layer 12 was black, and the third layer 13 was white, the light will be absorbed by the black layer and the hardcoat and the black layer will be burned away. The third white layer 13 does not absorb the light, and will thus remain unaffected. The final product is a graphic symbol having a white pattern etched on a black background. Likewise, if the first layer was purple, and the second layer was yellow, the final product would be a yellow etched pattern on a purple background.

All plastics that can be used with in-mold decorating, can be used in this invention, with the primary types belonging to the polycarbonate and acrylic categories. Etching can be done with different light intensities (laser), chemicals, plasma, or mechanical material removal. Using different light intensities will etch away different colors, and this invention can produce many color combinations, as long as the upper color is more etchable (light absorbing) than the lower color.

This invention can also be used to mark a housing for electronic devices and circuits. This can be accomplished by molding the housing in a first color, with a layer of etchable material of contrasting color molded over the surface of the housing. The etchable material is then selectively etched away to revert the desired pattern in the housing. The entire surface of the housing could be covered by the etchable material, or the housing could be molded to selectively have the etchable material placed in the areas where graphic patterns are required. The rest of the housing would be of the contrasting color. If the housing were for a radio, this invention would allow the elimination of hard-tooled labels along with improvements in the quality of the graphics pattern. In addition, if laser etching is used this would allow for improved flexibility in the assembly factory since the laser can be computer controlled, and all the radios would be the same until the laser etches the individual patterns. This allows one to completely assemble a radio prior to marking the graphical information on it.

Another version would involve molding the housing out of a clear material, then the etchable surface would include a non etchable contracting surface. For example, the housing could be clear, the in-mold etchable material could be a surface of white under a surface of black under a surface of hardcoat. The etching would remove the hardcoat and the black in a predetermined pattern. This would allow the use of back lighting which would shine though the clear plastic material and illuminate the white surface, creating a white graphic display. All the advantages of factory flexibility and improved graphics quality would be retained.

In summary the present invention provides a method for fabricating in-molded graphics. With such a method, the need for stick on labels and escutcheons is eliminated. The factory can inventory one type of product and then very easily customize the appearance of the graphics using computer controlled laser etching. The durability of this product is much better than that of pad printed products While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. A method for fabricating an in-mold graphics surface, the method comprising the steps of:
   a) molding at least one layer of an etchable material on a contrasting surface; and
   b) etching the at least one layer in a pattern to expose the contrasting surface to produce the in-mold graphics surface.

2. The method as described in claim 1, wherein step (a) further comprises including a layer of hardcoat material on the etchable material.

3. The method as described in claim 2, wherein step (b) further comprises etching the hardcoat in the pattern.

4. The method as described in claim 1, wherein the step of etching comprises laser etching, chemical etching, or plasma etching.

5. The method as described in claim 1, wherein step (a) further comprises including a second layer of material that is etchable at a different light intensity than the at least one layer of etchable material.

6. A method for marking a housing, the method comprising the steps of:
   a) molding at least a portion of the housing with at least one etchable material on a contrasting surface; and
   b) etching the at least one etchable material with a pattern to expose the contrasting surface such that the housing is marked.

7. The method as described in claim 6, wherein step (a) further comprises including a layer of hardcoat material on the etchable material.

8. The method as described in claim 6, wherein step (b) further comprises etching the hardcoat in the pattern.

9. The method as described in claim 6, wherein the step of etching comprises laser etching, chemical etching, or plasma etching.

10. The method as described in claim 6, wherein step (a) further comprises including a second layer of material.

11. The method as described in claim 10, wherein step (b) further comprises not etching the second layer of material.

12. The method as described in claim 11, wherein step (b) comprises etching with a light beam.

13. The method as described in claim 6, further comprising a step of disposing an electronic circuit within the housing prior to the step of etching.

14. A method for fabricating a radio housing with in-molded labeling, the method comprising the steps of:
   a) molding at least a portion of the radio housing to have a plastic surface, a first contrasting surface, a second contrasting surface, and a hardcoat surface; and
   b) etching the hardcoat surface and the first contrasting surface to expose the second contrasting surface to produce the in-molded labeling.

15. The method as described in claim 14, wherein the step of etching comprises laser etching, chemical etching, or plasma etching.

16. The method as described in claim 14, wherein the first contrasting surface is etched by a light beam, and the second contrasting surface is not etched by the light beam.

17. The method as described in claim 14, wherein the hardcoat surface is etched by a light beam.

18. The method as described in claim 14, further comprising a step of disposing a radio circuit within the housing prior to the step of etching.

19. The method as described in claim 14, wherein the etched in-mold labeling is illuminated by a light source within the housing.

* * * * *